Sept. 8, 1931. E. P. ERICSON ET AL 1,822,617
CONTROL VALVE PLUNGER
Filed Dec. 22, 1927
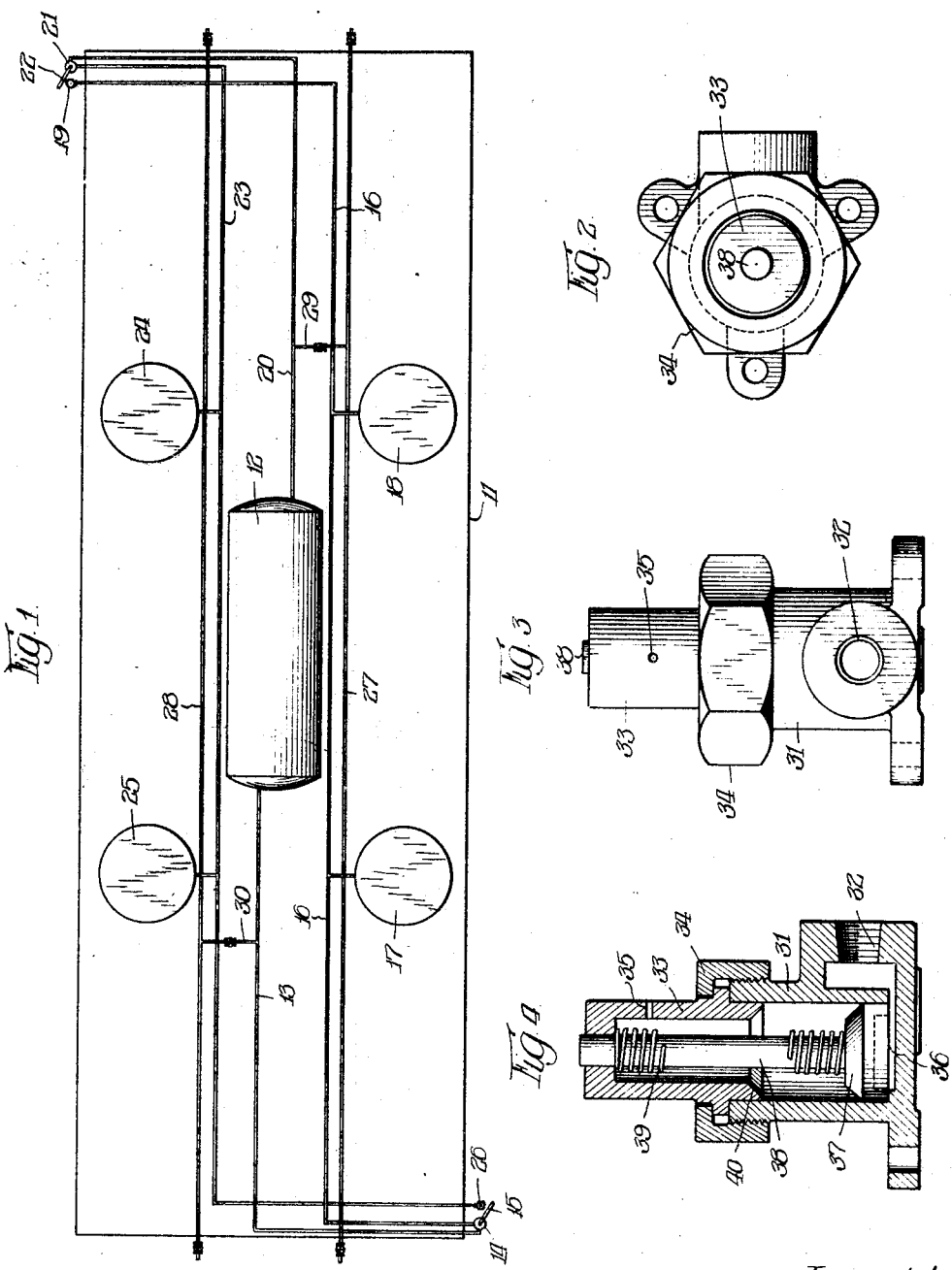
Inventors:
Eric P. Ericson,
William J. Moyle, Patented Sept. 8, 1931

1,822,617

UNITED STATES PATENT OFFICE

ERIC P. ERICSON AND WILLIAM J. MOYLE, OF HIBBING, MINNESOTA

CONTROL VALVE PLUNGER

Application filed December 22, 1927. Serial No. 241,988.

This invention relates to a new and improved valve interlock, and more particularly to an interlock especially adapted for use in connection with dump cars of the type dumping in more than one direction.

Many types of dump cars now in use are provided with one or more air cylinders located upon each side center line of the car for dumping purposes. One cylinder or set of cylinders is used for dumping in one direction and the other cylinder or set of cylinders is used for dumping in the opposite direction. The customary form of control consists in a separate three-way valve for controlling the dumping in each direction. A tank of compressed air is carried by the car and connected through the three-way valve to the dumping cylinders. With the valve in one position the air tank and cylinders are closed off. With it in the second position the air tank and cylinders are connected so that the pressure in the tank serves to raise the pistons in the cylinders and dump the car in one direction. With the valve in the third position the air tank is closed off and the cylinders are connected to the atmosphere.

In dumping these cars, particularly when the material being handled is wet or frozen, it is at times difficult to cause the entire load to dump in one direction. It may, therefore, be necessary to dump in the opposite direction or to swing the car in the opposite direction to loosen the material. Where the valve controls are independent it sometimes happens that the valve for dumping in the opposite direction is operated before the car body has reached its normal position. This results in both sets of cylinders being simultaneously fed with air and often results in damage to the hinge construction of the car.

It is an object of the present invention to provide an interlock whereby the car cannot be so operated as to attempt the dump simultaneously in both directions.

It is a further object to provide a means of this character which is automatically operated by the operation of one set of cylinders to prevent operation of the other.

It is an additional object to provide a construction of this character in which the control is responsive to the pressure in the cylinders whereby it is operative until the pressure in the cylinders has been fully released.

It is also an object to provide a construction which is simple in design and adapted for application to existing car control structures.

Other and further objects will appear as the description proceeds.

In the accompanying drawings we have shown somewhat diagrammatically the application of our invention to the car dumping system and have also shown in detail one form of control plunger.

In the drawings—

Figure 1 is a diagrammatic showing of the car dumping mechanism;

Figure 2 is a plan view of the control plunger;

Figure 3 is a side view of the control plunger; and

Figure 4 is a longitudinal sectional view of the plunger mechanism.

Referring first to Figure 1, the car has been diagrammatically indicated at 11. This carries the air tank 12 which is connected by pipe 13 to the three-way valve 14 having the operating handle 15. The valve 14 also communicates through pipe 16 with the dumping cylinders 17 and 18. The pipe 16 extends beyond the dumping cylinders 18 to the control plunger 19. The air cylinder 12 is also connected by pipe 20 to the three-way valve 21 having the operating handle 22. This valve 21 is connected by pipe 23 to dump cylinders 24 and 25. The pipe 23 is further extended to the control plunger 26 which is located in the path of the handle 15 of the three-way valve 14. There has also been shown on this figure the pipes 27 and 28 and the cross-pipes 29 and 30, which, with their valves, are used to supply air under pressure to the tank 12, and which form no part of the present invention.

The form of control plunger used is shown in detail in Figures 2 to 4. The housing 31 is provided with the threaded opening 32 for connection to the air pressure line. The upper portion 33 of the housing is held in place by the collar 34. The portion 33 is provided with the relief opening 35. The air is led to the under side of the plunger through the recess 36. The plunger is provided with a head 37 closely fitting the inside of the housing 31 and carried by a plunger stem 38 extending through an opening in the upper end of the member 33. The stem 38 is surrounded by a spring 39 which bears against the member 33 and against the rear of the head 37 to normally retract the stem 38 substantially within the contour of the housing. It will be understood that when air pressure is admitted to the under side of the plunger head 37, the plunger will be forced upwardly against the pressure of the spring and will seat against the seat 40. This seat may be formed to make a substantially air-tight fit with the under side of the plunger head 37. As long as pressure is in the housing the stem 38 will be extended above the housing and will be in the path of the operating handle of the adjacent three-way valve thus preventing opening of the valve to supply air under pressure to the other set of cylinders.

It is not necessary that the plunger head 37 make an absolutely air-tight fit with the inside of the casing 31 as the spring used will be light and the rush of air will force the head to seat against the seat 40 which will prevent any appreciable loss of air pressure. It will be apparent that the stem will remain extended until the pressure in the cylinders themselves has reached substantially normal. The use of this control plunger, therefore, prevents simultaneous operation of both dumping mechanisms and thereby prevents injury to the car structure.

While we have shown a preferred form of construction for our invention, it is capable of modification to adapt it to vary structures and conditions and we contemplate such changes and modifications as come within the spirit and scope of the appended claims.

We claim:

1. In a dump car or the like, air cylinders for dumping the car in one direction, additional air cylinders for dumping the car in another direction, separate control valves for the cylinders operating in each direction, and a plunger operated by air pressure, automatically interposed in the path of one valve operating means when the other valve is opened to operate its cylinders.

2. In a dump car or the like, air cylinders for dumping the car in one direction, additional air cylinders for dumping the car in another direction, separate control valves for the cylinders operating in each direction, an extension of the air line from each set of cylinders to a point adjacent the control valve of the other set of cylinders and a plunger operated by air in said extension when said cylinders are under pressure, to extend in the path of the operating means of the valve controlling the other set of cylinders to prevent operation of said valve.

Signed at Hibbing, Minnesota, this 10th day of December, 1927.

ERIC P. ERICSON.
WILLIAM J. MOYLE.